(12) United States Patent
Lamp et al.

(10) Patent No.: US 6,764,700 B2
(45) Date of Patent: Jul. 20, 2004

(54) DEEP DISH PIZZA CRUST

(75) Inventors: Mary A. Lamp, Fitchburg, WI (US); Keith Forneck, Hanover Park, IL (US); William T. Paulos, McFarland, WI (US)

(73) Assignee: Kraft Foods Holdings, Inc., Northfield, IL (US)

( * ) Notice: Subject to any disclaimer, the term of this patent is extended or adjusted under 35 U.S.C. 154(b) by 87 days.

(21) Appl. No.: 10/042,964

(22) Filed: Jan. 8, 2002

(65) Prior Publication Data
US 2002/0197360 A1 Dec. 26, 2002

Related U.S. Application Data

(63) Continuation-in-part of application No. 09/572,808, filed on May 17, 2000, now abandoned.
(60) Provisional application No. 60/134,569, filed on May 17, 1999.

(51) Int. Cl.$^7$ .............................................. B65D 85/00
(52) U.S. Cl. ........................... 426/120; 426/19; 426/20; 426/62; 426/94; 426/106; 426/128; 426/549
(58) Field of Search .......................... 426/94, 106, 128, 426/120, 549, 19, 20, 62, 275, 496

(56) References Cited

U.S. PATENT DOCUMENTS

| | | | |
|---|---|---|---|
| 3,979,525 A | * 9/1976 | Plemons et al. | ............ 426/321 |
| 5,375,701 A | 12/1994 | Hustad et al. | |
| 5,747,084 A | 5/1998 | Cochran et al. | |
| 5,792,499 A | * 8/1998 | Atwell | ........................ 426/549 |
| 6,048,558 A | 4/2000 | Feldmeier et al. | |

OTHER PUBLICATIONS

Encyclopedia of Chemical Technology, 1992, pp. 880–882.*

Baking Science & Technology, 1995, pp. 485–486.*

The Good Cook Snack & Sandwiches, 1980, pp. 66–67.*

David, Elizabeth. *English Bread and Yeast Cookery*. American Edition, Viking Press, 1977, p 255.

* cited by examiner

*Primary Examiner*—Lien Tran
(74) *Attorney, Agent, or Firm*—Fitch, Even, Tabin & Flannery

(57) ABSTRACT

A fully baked, deep dish pizza crust is provided having a water activity in the range of about 0.9 to about 0.95. The deep dish pizza crust is ideally suited for use in a refrigerated, ready-to-eat pizza kit. The deep dish pizza crust is of a convenient size and shape (generally square and about 4 by about 4 by about 0.75 in. deep) and is especially adapted as a single serving or snack food product. Also provided is a kit for preparing ready-to-eat deep dish pizza, the kit including one or more deep dish pizza crusts, pizza sauce, cheese, and one or more pizza toppings. The deep dish pizza crusts are designed so that they can be nested so as to reduce the volume requirements in the kit. Each of the components of the pizza kit, including the deep dish pizza crusts, is hermetically sealed from the other food items to substantially retard or prevent flavor, moisture, and microbial migration from one food item to another. The deep dish pizza crusts retain a soft, desirable texture throughout their anticipated shelf lives.

12 Claims, 3 Drawing Sheets

DEEP DISH PIZZA CRUST

RELATED APPLICATION

This application is a continuation-in-part application of U.S. application Ser. No. 09/572,808, filed on May 17, 2000, now abandoned which was based on, and claimed benefit of, U.S. Provisional Application Serial No. 60/134,569, filed May 17, 1999.

FIELD OF THE INVENTION

This invention relates to a pizza food product and a kit for assembling a deep dish pizza. The pizza crust of this invention is especially adapted for use in cartons and/or packages which also contain the other pizza ingredients necessary to assemble a snack or single-service sized, deep dish, ready-to-eat pizza.

BACKGROUND OF THE INVENTION

Pizzas, while widely available frozen, are generally not as widely available refrigerated. In general, available pizza products, frozen or refrigerated, need to be fully baked before they can be eaten. Once a fully baked pizza crust has been refrigerated or frozen, it tends to "toughen" or become leathery, stale, and/or dry. See, for example, David, English Bread and Yeast Cookery, American Edition, p. 255 (Viking Press, New York 1977). When a crust becomes "leathery" (a term of art), it becomes harder to chew and loses its "chewability." Furthermore, the distinction between the crisper bottom of the crust and the softer top part of the crust is generally lost when a baked crust is refrigerated.

Reheating pizza does not generally allow the crust's texture to return to its original state and may, in fact, further "toughen" it to an even more leathery texture. While such leftover pizza may be fully edible from all health and safety considerations, the organoleptic properties are generally diminished. Much of the loss of quality is due to the crust becoming more leathery. Fully baked pizzas or pizzas having a fully baked crust are not often found in grocery refrigerator or freezer cases.

Refrigerated pizzas with unbaked crust have their own problems. These include, for example, (1) sauce soaking into the crust (moisture migration), (2) sauce and other toppings becoming maldistributed on or knocked off the crust during transport, and (3) flavor, odor and microbiological migration (e.g., from sauce or meat to cheese). Moreover, such products must also be baked by the consumer thereby diminishing the convenience desired by most consumers. Even when baked in the home kitchen with conventional ovens, the overall quality is not as high as desired.

Feldmeir et al., U.S. Pat. No. 6,048,558, provided a meal kit containing a baked bread or dough product in a sealed pouch which is contained within a compartment contained within a base tray having an anti-fogging agent component. The anti-fogging agent assists in maintaining freshness and retarding staling under refrigerated, non-frozen conditions. Generally the anti-fogging agent is contained within a layer of the base trap or in other container elements so that enters the compartment in a time release manner so that it gradually blooms onto the internal surfaces within the meal kit. The anti-fogging agent is though to prevent the formation of water droplets within the container and thereby allow any trapped moisture to more easily evaporate from the meal kit.

U.S. Pat. No. 5,747,084 provided a packaged pizza product containing a pre-baked pizza crust and other pizza ingredients (i.e., pizza sauce and one or more pizza toppings). The pizza crusts included in the kit of this patent were generally flat, thin, and circular.

There remains a need for a pizza crust which can be fully baked, refrigerated, and subsequently eaten cold, warm, or hot (i.e., reheated) without the need for further baking and without becoming leathery and which retains the desired crust properties (especially relating to texture) while, at the same time, providing a relatively rigid, but soft, crust upon which toppings can be placed. Moreover, there still remains the need for a fully baked deep dish pizza crust which can be used in a kit format and which retains its soft texture throughout the expected shelf life of the kit and remains tasty and chewable when eaten hot or cold. There further exists a need for a ready-to-eat deep dish pizza and kit containing a deep dish baked crust which can be refrigerated without the crust becoming leathery, dry, and/or stale; and which remains equally tasty and satisfactorily chewable either hot or cold. There further exists a need for a ready-to-eat deep dish pizza and kit containing a deep dish baked crust which can be refrigerated without the crust becoming leathery, dry, and/or stale; which remains equally tasty and satisfactorily chewable either hot or cold; and which does not require the use of an anti-fogging agent.

The present invention provides such deep dish, fully baked, ready-to-assemble pizza crusts and kits containing such pizza crusts in combination with other pizza components such as, for example, pizza sauces, cheeses, and/or toppings. Once assembled, the deep dish pizzas of this invention can be eaten as is or after heating.

SUMMARY OF THE INVENTION

The invention comprises a farinaceous pizza crust which can be fully baked, then refrigerated and later served cold or reheated without becoming leathery, dry, stale and/or tough. Preferably, the pizza crust is configured to have a deep dish shape. After baking, the crust preferably has a water activity in the range of about 0.90 to about 0.95 and retains satisfactory texture and chewability characteristics throughout a refrigerated shelf life that may be, e.g., about 75 days. The pizza crust is preferably adapted for use in a "single-serving" kit which allows easy preparation of a ready-to-eat, deep dish pizza. The kit preferably contains (1) at least one of the pizza crusts, (2) pizza sauce, (3) one or more cheese products, and, if desired, (4) one or more additional components that may include, for example, proteinaceous components such as sausage, pepperoni, ham or anchovies, or vegetable components such as slices of green pepper or olives. The pizza crust products and kits containing the pizza crust products of the present invention do not require the use of an anti-fogging agent to achieve the desired shelf life. The kit may also contain other items, e.g., a soft drink or other beverage and/or candy item. Preferably, the kit is contained in a single serve package having separate pouches and/or compartments for each of the various components to be separately sealed under an inert atmosphere to increase the shelf life of the product or kit. The seals are preferably hermetic, and are capable of withstanding stresses and strains associated with shipping and handling, including pressure variations associated with transport to and through high altitudes.

DETAILED DESCRIPTION OF PREFERRED EMBODIMENTS

The invention is preferably embodied in a fully baked, farinaceous food product that can be refrigerated without development of a leathery texture. More particularly, the invention is preferably embodied in a fully baked deep dish pizza crust that has an extended refrigerated shelf life. The preferred pizza crust can be refrigerated without development of a leathery texture, retaining a soft texture for extended periods of time, preferably about 75 days or more. The invention may also be embodied in a kit containing a fully baked deep dish pizza crust and additional components for the assembly of a ready-to-eat pizza that can be eaten cold or heated. The pizza crusts may be nestable, and may be included in a tray-type package with additional pizza components which are storable at refrigerated temperatures and from which one may assemble a ready-to-eat pizza. Neither the pizza crust product nor the packaging materials including in the kit require an anti-fogging agent to achieve the desired characteristics of the refrigerated product. Thus, neither the pizza crust product nor the packaging materials including in the kit contain such an anti-fogging agent.

Figure 4:
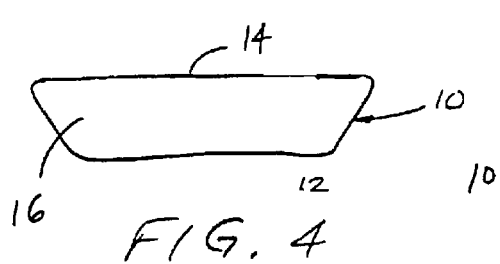
FIG. 4 is a side view of the pizza crust of FIG. 1.
Figure 1:
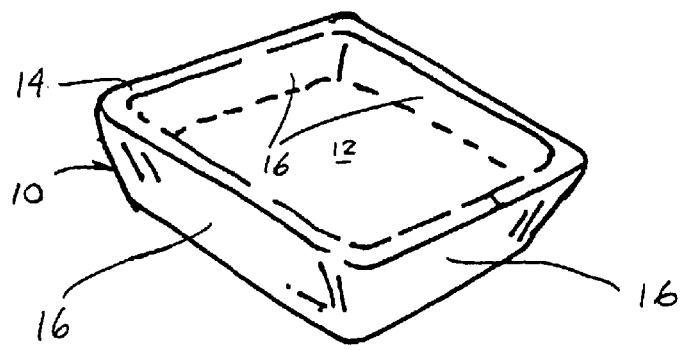
FIG. 1 is a perspective view of a ready-to-assemble deep dish pizza crust in accordance with an embodiment of the invention.

A deep dish pizza crust 10 in accordance with a preferred embodiment of the invention is illustrated in FIG. 1 (perspective view) and FIG. 4 (side view). Although the pizza crust 10 is illustrated as being essentially square, other basic shapes (e.g., rectangular, triangular, round, oval, or the like) can be used if desired. It is generally preferred, however, that the basic shape be generally rectangular and, most preferably, generally square. The rectangular/square shapes will generally be more easily packaged in the kits contemplated by this invention. The base 12 is preferably of a smaller dimension than the top or rim 14 so that the sides 16 slope outward from bottom to the top. The slanting sides 16 are of generally uniform thickness, e.g., about ¼ to about ½ in. thick with about ⅜ in. thick being preferred. While the sides may be substantially vertical in other embodiments, in the preferred embodiment the sides 16 are slanted outward. The depth 18 of the "dish" formed in the pizza crust is preferably about ⅝ to about ⅞ in., with about ¾ in. being preferred. Preferably, the bottom or base of the crust 12 in FIG. 1 forms a square of about 3.4 to about 3.6 in. and about ¼ to about ½ in. thick (or about 5 to 9 mm thick) and preferably is about 3½ in. square by about ⅜ in. thick. The top rim 14 is of larger dimension than the base 12 to allow for the slanted sides 16. Preferably, the top rim 14 will be about 4.2 to about 4.3 in. along each dimension. For a preferred base dimension of about 3½ in. square, the top rim 14 would have a dimension of about 4¼ in. square.

Figure 2:
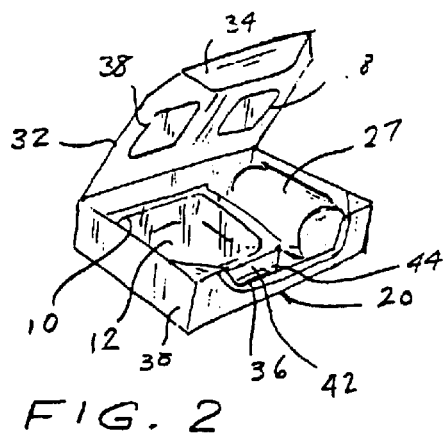
FIG. 2 is a perspective view of a pizza kit that includes a plurality of the crusts of FIG. 1.
Figure 3:
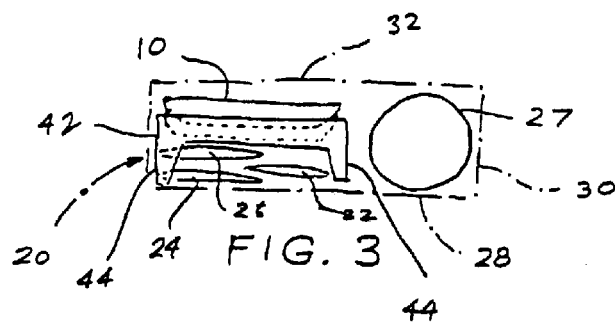
FIG. 3 is a schematic elevation of the pizza kit of FIG. 2.

FIGS. 2 and 3 illustrate a ready-to-assemble pizza kit containing a plurality of fully baked, deep dish pizza crusts 10 in a carton 20 with additional and separate packages of other pizza components. Such other components can include, for example, pizza sauce 22, shredded or cubed cheese 24, and/or additional pizza toppings 26. Such additional pizza toppings can include, for example, additional cheese or a mixture of additional cheeses, pepperoni slices, salami, bacon bits, Canadian bacon, ham dried vegetables (e.g., onions, peppers, olives and the like), sausage, beef, spices, and other pizza ingredients. Examples of pizza sauces include traditional tomato-based sauces, salsa, catsup-based sauce, white sauce, or other spreadable sauce usable to create flavorful pizza-style products. Examples of the cheese products which may be included in the kit comprise natural cheeses such as mozzarella, Parmesan, Romano, Swiss cheddar, Monterey jack, Gruyere, and similar products. If desired, other components can also be included in the kit. Such other components include, for example, a drink 27, dessert 30 (e.g. candy), an implement or utensils to spread the sauce, salt, pepper, other spices, napkins, and the like. Preferably the pizza ingredients, including the crusts, are packaged in separate containers such as pouches, cups, cans, or jars. In the illustrated embodiment, separate pouches are formed from oxygen-impermeable film. In other embodiments, separate compartments may be formed in the tray and sealed with oxygen-impermeable film. In either case, the components are sealed under an inert atmosphere or under inert gas flushed conditions.

Figure 5:
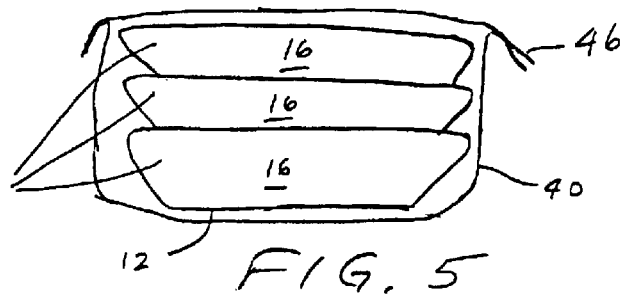
FIG. 5 is a side view of a nested stack of the pizza crusts of FIG. 1.

FIG. 5 illustrates how the slanting side walls 16 allow the pizza crusts to nest together. If desired, parchment or paper liners (not shown) can be used to separate the nested pizza crusts (especially around their rim areas) to allow them to be more easily separated when consumed. If desired, such parchment or paper liners may include pull tabs, strips or other features that the consumer can employ to help separate the nested pizza crusts. Additionally, and if desired, the separating parchment or paper liners may be coated or impregnated lightly with oil (containing various spices if desired) to help retain the desired texture and appearance of the pizza crusts. Generally, it is preferred that pizza kits of the present invention contain 2 to 4 nested pizza crusts. Of course, for kits designed for multi-person use (i.e., family sized units) a higher number of pizza crusts may be included along with proportionally increased amounts of other pizza ingredients. Even in such larger kits, it may still be desirable to package the various components, including the pizza crusts, in smaller single serving sizes so that the consumer may open less than all of the particular component while allowing the remainder to be stored in its original, unopened condition. The interior of the uppermost nested pizza crust (see FIG. 5) can be used to store other components in the kit so long as these other components are contained in separate pouches or containers.

Turning to a more detailed description of the preferred crust, it should first be noted that the percentages used in the present specification to describe the pizza crust dough are generally a baker's percentages, which are weight percentages based on the weight of flour used in a specific recipe (generally per 100 pounds of flour). For example, for 100 pounds of flour in a recipe, 57 percent water and 1.5 percent salt would mean the addition of 57 pounds of water and 1.5 pounds of salt, respectively, to 100 pounds of flour. Of course, such baker's percentages do not normally add up to 100 percent. Conventional percentages can be calculated from bakers percentages by normalizing to 10 percent.

Baking science involves a complicated process employing time, temperature and relative humidity to produce various food products. The time, temperature and relative humidity parameters are generally different for bread, rolls, pizza crusts, pastry and cereal products, not only with regard to their appearance (crust color, size, etc.), but also with regard to the development, texture, and size. Some of the desirable changes caused by baking are protein denaturing, starch gelatinization, moisture migration and veracity (cell development or grain). Many factors may be involved in preparing a baked product which is appealing in the eyes of the ultimate consumer. A manufacturer must also consider items such as shelf life and how a consumer will actually use a product. Consequently, it is desirable to have some quantitative measure by which one can determine whether a production line product meets specification. One such measure is water activity.

Water activity is a measure of the percent of water remaining in a baked product after it has been baked. Cracker products typically have a water activity in the range of about 0.35 to 0.50. Common baked goods, for example, bread, dinner rolls and pizza crusts, typically have a water activity in the range of about 0.90 to 0.98. The fully baked pizza crust of this invention preferably has water activities of about 0.90 to about 0.95, with a value of about 0.93 being particularly preferred. Such fully baked pizza crusts have satisfactory refrigeration storage characteristics as well as satisfactory texture and taste when used to prepare a ready-to-eat pizza, whether unheated or heated, and whether eaten cold or warm.

The water activity of the pizza crust is measured after the crust has come out of the oven and cooled to about 100° F. For deep dish pizza crusts of the present invention, the water activity is generally measured about after the fully baked crust is removed from the baking oven. Moisture content of the deep dish pizza crust may be measured with an $a_w$ meter, or by weight difference between the crust after cooling to about 100° F. and after further, more complete drying (i.e., using a desiccator or other suitable and reliable method). Generally, the moisture content of fully baked deep dish pizza crust is about 89 to 99 percent, and preferably in the range of about 91 to about 93 percent.

Since yeast is included in the formulation of pizza dough, a fermentation or rising step is included in the dough preparation. The fermentation step allows the yeast to produce carbon dioxide gas which stretches and mellows the gluten contained in the flour, and aids in producing good flavor and texture. However, the large commercial baking operations such as will be used to prepare the crusts of the invention, fermenting all the dough to be baked requires large equipment outlays, is time consuming and is therefore costly. It has been found that in practicing the invention, one can produce a flavorful and texturally pleasing pizza crust by fermenting a portion of the dough and adding an aliquot of the fermented dough to bulk unfermented dough. The fermented dough is thoroughly mixed with the unfermented dough, and the resulting mixture is divided, cut to size, shaped, and baked. In the time period from mixing to baking, the dough mixture continues to rise and develop the desired characteristics. It has been found that a dough mixture containing about 2 to about 7 percent fermented dough and about 93 to about 98 percent unfermented dough produces satisfactory results. One preferred embodiment contains about 3 to about 5 percent fermented dough. Other preferred embodiments may contain up to 10% fermented dough.

The texture of the baked pizza crust of the invention can be additionally changed by laminating the dough somewhat in the manner used to prepare croissants or Danish pastries. A laminate of three to six layers, preferably three to four layers, may be formed by folding the dough back-and-forth across itself (i.e., layering). Lamination is believed to result in a baked product having improved texture and taste when cold or heated. The dough, whether laminated or not, is formed into the desired shape (e.g., see FIG. 1).

A basic recipe (in baker's percentages) for pizza crust prepared according to a preferred embodiment of the invention follows.

| Ingredient | Range (% flour basis) | Preferred Range (% flour basis) | Most Preferred (% flour basis) |
|---|---|---|---|
| Flour | 100 | 100 | 100 |
| Sweeteners | 5.0–15.0 | 8.0–12.0 | 10.0 |
| Butter Chips | 7.5–17.5 | 10.5–14.5 | 12.5 |
| Salt | 1.5–3.5 | 2.0–3.0 | 2.5 |
| Dough Relaxer | 1.0–2.25 | 2.0–2.25 | 2.25 |
| Yeast | 0.5–5.0 | 2.5–3.5 | 3.0 |
| Shortening | 1.0–6.0 | 2.0–4.0 | 3.0 |
| Monoglycerides/Diglycerides | 0.4–2.0 | 0.5–1.5 | 1.0 |
| Dried Egg White | 0–2.0 | 0.75–1.5 | 1.0 |
| Sodium Stearoly Lactylate | 0–0.5 | 0.4–0.5 | 0.5 |
| Calcium Propionate | 0–0.5 | 0.4–0.5 | 0.45 |
| Alpha Amylase Enzyme | 0.2–0.4 | 0.3–0.35 | 0.32 |
| Guar Gum | 0–0.3 | 0.15–0.25 | 0.22 |
| Water | 53–63 | 54–60 | 60 |
| Spices/Seasonings | 0–1.0 | 0.3–0.4 | 0.35 |

In other embodiments, other ingredients may be substituted for some of those listed above. For example, calcium stearoyl lactylate might be used in place of the sodium stearoyl lactylate, or other mold inhibitors could be used in place of, or combined with, calcium propionate. The flour is preferably hard wheat bread flour made from hard spring or winter wheat. The shortening is preferably a solid, hydrogenated or partially hydrogenated vegetable oil; for example, a hydrogenated or partially hydrogenated cottonseed, corn, soybean, sunflower, canola oil, or mixture thereof, and similar hydrogenated or partially hydrogenated vegetable oils and mixtures. The preferred vegetable oils are corn, canola, sunflower seed, cottonseed and soybean oils, or mixture thereof. The shortening may have a butter flavoring agent added to the shortening by the producer. Alternatively, a butter flavoring agent or other flavoring agent may be added to the recipe in an amount known to those skilled in the art or in accordance with the flavor manufacturer's recommendations. Compressed yeast may be substituted for the dried yeast used in the above basic recipe. If compressed yeast is used, the baker's percentage or weight is approximately tripled to account for the water content of the compressed yeast; likewise, the amount of water added may be reduced to account for the water content of the compressed yeast. Therefore, if compressed yeast is used in the above general recipe in place of dried yeast, the amount of compressed yeast will be in the range of about 1.5 to about 15 percent, preferably about 7.5 to about 10.5 percent.

The baked pizza crusts can be assembled in any suitable packaging. Such packaging should not, however, contain the anti-fogging agents used in U.S. Pat. No. 6,048,558. Although the pizza crust described herein may be packaged and sold as a stand alone product, it is generally preferred that it be included as part of a ready-to-assemble and eat kit as described above.

Example of packages of a type that might be adapted for use for the ready-to-eat pizza kit of the invention are shown, e.g., in U.S. Pat. Nos. 5,375,701 and 5,747,084, which are hereby incorporated by reference. As noted above, the food packages of the present invention do not require, and do not contain, the anti-fogging agents used in U.S. Pat. No. 6,048,558. These packages will include a tray portion and a seal portion. The tray portion can be of a relatively rigid or shape retentive material e.g., plastic, and may include walls that define compartments for receipt of food products therein. A main food product or item or entree can be held in a main compartment that can be larger than the other compartments in which other food items are held such as side dishes or snacks, and/or, as in the present invention toppings, to be placed on the deep dish crusts(s) held in the main, larger compartment. Accordingly, one or several of the compartments can contain farinaceous food products, and one or several of the compartments can contain proteinaceous food products. A ready to drink beverage product in a container can also be included in one of the compartments. With the food products in the compartments, the seal portion, film which can be a flexible plastic film material, is attached to the top of the walls, such as on an upper rim area about the compartments, as by an adhesive or the like. This sealing of the package can provide it with a hermetic seal that sufficiently minimizes leakage therethrough to keep the contents fresh for a commercially satisfactory extended shelf life period while refrigerated. In addition, the seal minimizes undesirable transfer of flavor and odor between the products in the different compartments.

In the illustrated embodiments, the package for the kit takes a different form, comprising an outer paperboard carton 20 having the various different components contained therein in individually sealed pouches. In the preferred embodiments, pouches containing the pizza crusts and a beverage are positioned to be visible through windows in the carton 28.

The outer carton 20 is of a generally parallelepiped shape, comprising a rectangular bottom 28, four generally rectangular upstanding side walls 30, and a generally rectangular hinged lid 32. The lid has a depending front flap 34 to cover an opening 36 in the front wall. The lid also preferably has one or more windows 38 therein to permit viewing of the contents of the kit. The lid 32 preferably provided with conventional means for retaining it in closed position, then facilitating opening. Such means may comprise, e.g., securing the front flap to the front wall with adhesive, and providing a flap, tear strip, pull tab or the like on the lid to facilitate opening.

The contents of the kit preferably are arranged in layers. The embodiment FIGS. 6A–6C has three layers of pizza components on the left side and a beverage 27 such as a 12 oz can of soft drink on the right. The bottom or first layer of pizza components comprises a pouch of shredded cheese 24, a pouch of pizza sauce 22, and a confectionary or dessert item 29 such as a candy item or the like, contained in a sealed wrapper. The components in the first layer overlap somewhat, as shown in FIG. 6A.

The second layer comprises a pouch 26 containing an additional topping, preferably a proteinaceous component, e.g., pepperoni slices.

The third layer comprises a plurality of pizza crust 10, sealed in a pouch 40, supported on a carrier 42. The carrier has feet 44 at its four corners to mechanically isolate the crusts from the other components, and to laterally stabilize the beverage container. Each of the pouches preferably has a seal that is substantially hermetic. The pouches preferably have easy-open features. In particular, the pouch 40 containing the pizza crusts preferably has a peelable seal 46 at one corner. Each of the seals of the pouches is preferably capable of withstanding the stresses and strains associated with shipping and handling, including atmospheric pressure drops, which may occur due, e.g., to transportation from a packaging facility at an elevation near sea level to or through a rocky-mountain elevation of 5,000 to 10,000 feet.

Figure 6A:
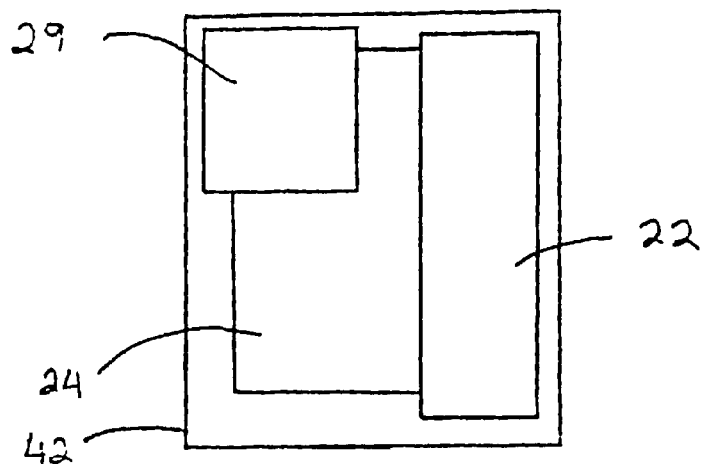
FIGS. 6a–6c are schematic plan views of the kit of FIG. 2.
Figure 6B:
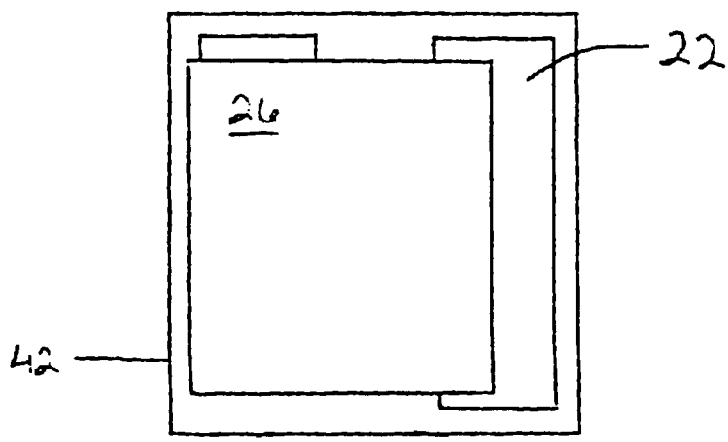
Figure 6C:
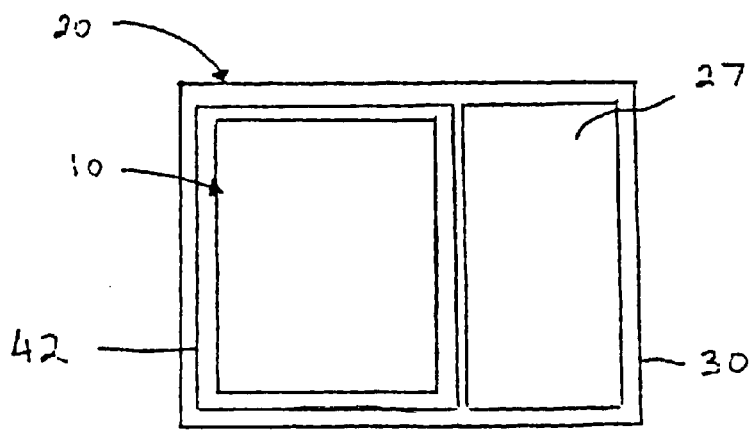
Figure 7A:
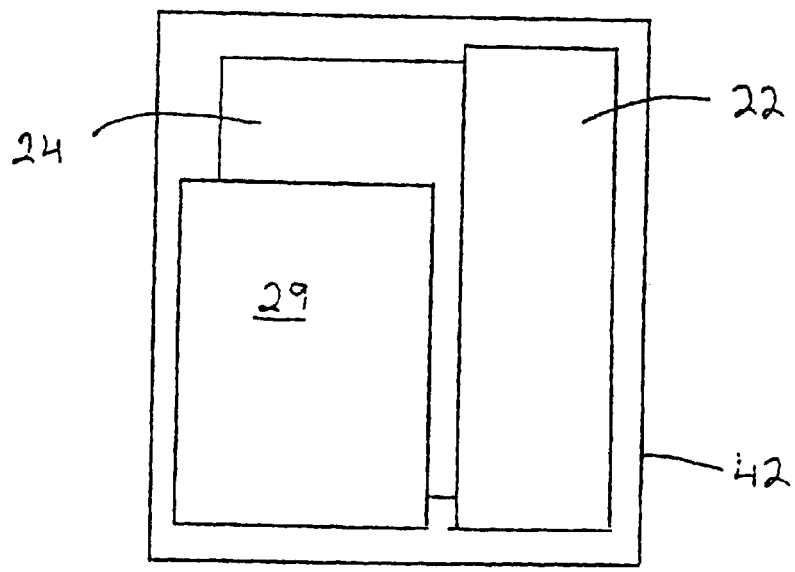
FIGS. 7a and 7b are schematic plan views of a kit in accordance with another embodiment of the invention.
Figure 7B:
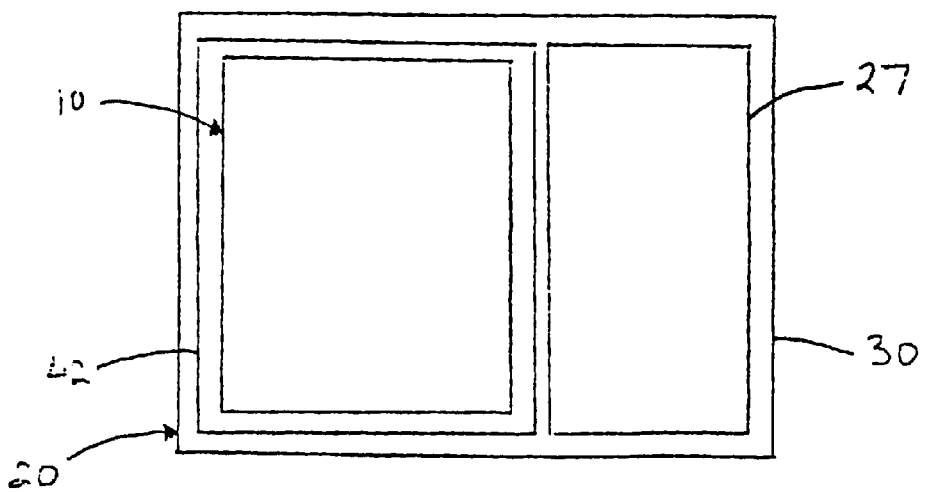

The embodiment of FIGS. 7A and 7B is similar to that of FIGS. 6A–C, except the proteinaceous component is eliminated, to provide a cheese pizza kit.

In either embodiment, the candy item 29 may comprise, e.g., Reese's Pieces candy, Crispy M&M's candy, Reese's Peanut Butter Cup, or any other suitable candy item.

For use, the pizza kit package is opened, the crusts removed, and the pizza assembled. The side walls help to retain the toppings on the crust. If desired, the pizza may be heated in a conventional or a microwave oven. A recommended microwave heating time at full oven power falls within the range of about 20 to about 80 seconds, and preferably within about 20 to about 40 seconds in order to preserve the taste, texture, and chewability characteristics of the crust.

The following examples are intended to illustrate the invention and not to limit or otherwise restrict the invention.

EXAMPLE 1

Preparation of Deep Dish Pizza Crust

A pizza dough was made using the following formulation:

| Ingredient | Amount (% flour basis) |
| --- | --- |
| Flour | 100 |
| High Fructose Corn Syrup (42%) | 10.0 |
| Butter Chips | 12.5 |
| Salt | 2.50 |
| Dough Relaxer | 2.25 |
| Dried Yeast | 3.0 |
| Soy Bean Oil | 3.0 |
| Monoglycerides/Diglycerides | 1.0 |
| Dried Egg White | 1.0 |
| Sodium Stearoyl Lactylate | 0.50 |
| Calcium Propionate | 0.45 |
| Alpha Amylase Enzyme | 0.32 |
| Guar Gum | 0.22 |
| Water | 60 |
| Granulated Garlic | 0.35 |

All dry components were mixed using low speed mixing for about 1 minute, in a horizontal mixer followed by the wet components which were mixed in using medium speed mixing for about 6 minutes, followed by the butter chips which were mixed using low speed mixing for about 1 minute. The resulting dough was then sheeted into flat sheets, cut into 4.25 in. squares with roll cutters cutting the first two parallel sides and guillotine cutters cutting the final two parallel sides. The dough squares were placed on the bottom of a pizza forming pan to obtained the desired deep dish shape. Each square contained about 44 to about 50 grams raw dough. The dough was cold-pressed in the pan via a press head that pushes and spreads the dough to evenly distribute it about the pan so that it assumes the shape of the pan.

The pizza crust dough shapes were proofed at about 85 percent relative humidity and about 110° F. Proofing was carried out for about 15 to about 20 minutes; satisfactory proofing can be determined when the pizza crusts stay indented when pressed lightly with a finger. After proofing, the proofed pizza crusts are baked at about 400° F. commercial oven for about 3 to about 4 minutes to yield a pizza crust that is fully baked and has a golden brown color. Preferably, the baked pizza crusts are immediately frozen using a −20° F. blast freezer. The pizza crusts, nested in groups of two each, were then packaged in a film pouch or bag using vacuum and then flushing with nitrogen before sealing. Preferably, the baked pizza crusts are kept frozen until offered for retail sale to maximize the product life.

We claim:

1. A kit for making or assembling a ready-to-eat deep dish pizza, said kit comprising an outer carton; pizza compartments comprising a plurality of farinaceous baked, yeast raised, deep dish pizza crusts, a pizza sauce, a first topping comprising a cheese topping, and a second topping selected from the group consisting of an additional cheese topping and a non-cheese topping; the plurality of baked, yeast raised, deep dish pizza crusts being nested together; wherein the pizza components are independently sealed in individual pouches; wherein each of the pizza crusts has water activity in a range of about 0.90 to about 0.95; wherein the pizza crust has slanted side walls to allow nesting of the pizza crusts; wherein each pizza crust maintains its water activity in range of about 0.90 to about 0.95 throughout a shelf life of the kit of at least 75 days; and wherein the pizza crust is prepared from a pizza dough comprising, in bakers percentages, about 100 pounds of flour, about 5.0 to about 15.0 pounds sweetener, about 7.5 to about 17.5 pounds butter chips, about 1.5 to about 3.5 pounds salt, about 1.0 to about 2.25 pounds dough relaxer, about 0.5 to about 5.0 pounds yeast, about 1.0 to about 6.0 pounds shortening, 0.4 to about 2.0 pounds monoglycerides and diglycerides, about 0 to about 2.0 pounds dried egg whites, about 0 to about 0.5 pounds sodium stearoyl lactylate, about 0 to about 0.5 pounds calcium propionate, about 0.2 to about 0.4 pounds alpha amylase enzyme, about 0 to about 0.3 pounds guar gum, about 53 to about 63 pounds water, and about 0 to about 1.0 pounds spices and seasonings; and wherein the kit does not contain an anti-fogging agent.

2. The kit as defined in claim 1, wherein the individual pouches are hermetically sealed.

3. The kit as defined in claim 2, wherein each of the individual pouches is capable of withstanding substantial atmospheric pressure variations while remaining hermetically sealed.

4. The kit as defined in claim 3, wherein said second topping comprises a proteinaceous food product.

5. The kit as defined in claim 4, wherein each pouch is sealed under an inert atmosphere or under inert gas flushed conditions.

6. The kit as defined in claim 5, wherein the components are arranged in layer within the outer carton.

7. The kit as defined in claim 6, further comprising a carrier to stabilize the contents, said carrier having legs to support one or more components above one or more other components without compressing said one or more other components.

8. The kit as defined in claim 1, wherein the first topping is a cheese selected from the group consisting of mozzarella, Parmesan, Romano, Swiss, cheddar, Monterey jack and Gruyere.

9. The kit as defined in claim 8, wherein the second topping is selected from the group consisting of mozzarella cheese, Romano cheese, Parmesan cheese, Swiss cheese, cheddar cheese, Monterey jack cheese, Gruyere cheese, pepperoni, sausage including Italian and Polish sausage, cooked ground beef, cooked ham and bacon, Canadian bacon, bacon bits artificial bacon flavored bits, olives, peppers, onions, anchovies, shrimp, and crab.

10. The kit as defined in claim 1, wherein the first topping is mozzarella cheese and the second topping is pepperoni.

11. The kit as defined in claim 1, wherein the water activity of the pizza crusts is about 0.93.

12. The kit as defined in claim 1, wherein the pizza crust is prepared from a pizza dough comprising, in bakers percentages, about 100 pounds of flour, about 8.0 to about 12.0 pounds sweetener, about 10.5 to about 14.5 pounds butter chips, about 2.0 to about 3.0 pounds salt, about 2.0 to about 2.25 pounds dough relaxer, about 2.5 to about 3.5 pounds yeast, about 2.0 to about 4.0 pounds shortening, 0.5 to about 1.5 pounds monoglycerides and diglycerides, about 0.75 to about 1.5 pounds dried egg whites, about 0.4 to about 0.5 pounds sodium stearoyl lactylate, about 0.4 to about 0.5 pounds calcium propionate, about 0.3 to about 0.35 pounds alpha amylase enzyme, about 0.15 to about 0.25 pounds guar gum, about 54 to about 60 pounds water, and about 0.3 to about 0.4 pounds spices and seasonings.

* * * * *

UNITED STATES PATENT AND TRADEMARK OFFICE
CERTIFICATE OF CORRECTION

PATENT NO. : 6,764,700 B2 Page 1 of 1
APPLICATION NO. : 10/042964
DATED : July 20, 2004
INVENTOR(S) : Lamp et al.

It is certified that error appears in the above-identified patent and that said Letters Patent is hereby corrected as shown below:

In column 9, claim 1, line 24, change "bakers" to -- baker's --.

In column 10, claim 12, line 29, change "bakers" to -- baker's --.

Signed and Sealed this

Twelfth Day of February, 2008

JON W. DUDAS
*Director of the United States Patent and Trademark Office*